United States Patent
Gopisetty et al.

(10) Patent No.: US 8,069,415 B2
(45) Date of Patent: Nov. 29, 2011

(54) SYSTEM AND METHOD FOR GENERATING PERSPECTIVES OF A SAN TOPOLOGY

(75) Inventors: Sandeep K. Gopisetty, Morgan Hill, CA (US); Sumant Padbidri, San Jose, CA (US); Prasenjit Sarkar, San Jose, CA (US); Chung-Hao Tan, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2626 days.

(21) Appl. No.: 10/676,698

(22) Filed: Sep. 30, 2003

(65) Prior Publication Data

US 2005/0071482 A1    Mar. 31, 2005

(51) Int. Cl.
*G06F 15/177* (2006.01)
*G06F 15/16* (2006.01)

(52) U.S. Cl. ......... 715/736; 715/734; 715/737; 715/738

(58) Field of Classification Search .................. 715/734, 715/530–531, 501, 764, 790, 736, 737, 738, 715/853, 854; 705/26–27, 67
See application file for complete search history.

(56) References Cited

U.S. PATENT DOCUMENTS

| | | | | |
|---|---|---|---|---|
| 5,802,286 | A * | 9/1998 | Dere et al. | 709/220 |
| 5,958,012 | A * | 9/1999 | Battat et al. | 709/224 |
| 6,789,090 | B1 * | 9/2004 | Miyake et al. | 707/104.1 |
| 6,885,387 | B1 * | 4/2005 | Machida | 715/736 |
| 2002/0113816 | A1 * | 8/2002 | Mitchell et al. | 345/734 |
| 2003/0146929 | A1 | 8/2003 | Baldwin et al. | |
| 2004/0064545 | A1 * | 4/2004 | Miyake | 709/224 |
| 2004/0215904 | A1 * | 10/2004 | Gopisetty et al. | 711/153 |
| 2005/0071482 | A1 * | 3/2005 | Gopisetty et al. | 709/229 |

FOREIGN PATENT DOCUMENTS

| | | |
|---|---|---|
| JP | 09-093265 | 4/1997 |
| JP | 2002-132407 | 5/2002 |
| JP | 2003-141054 | 5/2003 |
| JP | 2003-263349 | 9/2003 |
| JP | 2003-264555 | 9/2003 |

OTHER PUBLICATIONS

Drew Bird, Storage Basics: Storage Area Networks, http://www.enterprisestorageforum.com/sans/features/article.php/981191, Feb. 26, 2002.*

* cited by examiner

*Primary Examiner* — Nicholas Augustine
(74) *Attorney, Agent, or Firm* — Mark C. McCabe; Lewis Nunnelley

(57) ABSTRACT

A SAN management system including the ability to generate perspectives of a SAN topology is provided. The SAN management system includes a SAN manager program to monitor a SAN. The SAN management system further includes a SAN management database linked with the SAN manager program, wherein the SAN management database maintains information identifying devices included within the SAN and connections between the devices. In addition, the SAN management system includes a plurality of sensor agents positioned within the devices included within the SAN, wherein the sensor agents gather information pertaining to the connections between the devices and provide the gathered information to the SAN manager program for inclusion within the SAN management database. Moreover, the SAN management system includes a topology viewer linked to the SAN manager to generate a user requested topology perspective according to data included within the SAN management database and data associated with a previously requested topology perspective.

12 Claims, 10 Drawing Sheets

US 8,069,415 B2

SYSTEM AND METHOD FOR GENERATING PERSPECTIVES OF A SAN TOPOLOGY

FIELD OF THE INVENTION

The present invention relates to the field of Storage Area Networks (SANs) and, more specifically, to a method of providing a perspective of a SAN topology in which information pertaining to prior SAN topology perspective is utilized.

BACKGROUND

Industry needs storage management today in open environments for the same reasons that storage management was needed in the mainframe environment in the early and mid-1980s. Businesses are generating data so fast that data storage and data management capabilities are being overwhelmed. If these capabilities cannot handle the growth, then at some point, there is a risk that the next transaction will not be captured, and the business will stop. There are two problems which impact this situation: Storage costs and storage management costs. Storage Area Networks (SANs) are becoming the preferred storage architecture model for block storage systems in comparison to direct attached storage models. This preference for SANs over direct attached storage models is as a result of SANs allowing multiple servers to directly share block storage devices, SAN users not having to purchase servers just to increase the storage capacity and the ability to separate server and storage management.

In order to leverage the benefits of a SAN, it is necessary to be able to easily manage the SAN. SAN management is the set of tools, policies and processes, that provide information about and monitor the devices in a Storage Area Network (SAN). SAN management tools are typically deployed along with every SAN installation.

To manage a SAN it is helpful to have a SAN management tool which can generate topology perspectives, where such perspectives identify hosts, storage devices, switches and any other necessary devices included within the SAN. It is of further benefit to have a SAN management tool which provides a topology perspective of all storage devices that are connected to a particular host (e.g., host centric perspective), a topology perspective of all hosts that are accessing a particular storage device (e.g., device centric perspective). Moreover, it is of further benefit to have a perspective which identifies all nodes (e.g., hosts, storage devices, switches, interconnection devices, etc.) within a SAN which are accessible by a particular node within the SAN (e.g., SAN node perspective).

Currently, every time a system administrator requests a particular type of SAN perspective the SAN management tool retrieves data necessary to satisfy the request by invoking multiple queries from a database associated with the SAN management tool and organizing the retrieved data into the particular type of SAN perspective (e.g., host perspective, storage device perspective, etc.).

SUMMARY OF THE INVENTION

According to the present invention, there is provided a SAN management system to generate perspectives of a SAN topology. The SAN management system includes a SAN manager program to monitor the SAN. In addition, the SAN management system includes a SAN management database linked with the SAN manager program, wherein the SAN management database maintains information identifying devices included within the SAN and connections between the devices. Also, the SAN management system includes a plurality of sensor agents positioned within the devices included within the SAN, wherein the sensor agents gather information pertaining to the connections between the devices and provide the gathered information to the SAN manager program for inclusion within the SAN management database. Moreover, the SAN management system includes a topology viewer linked to the SAN manager to generate a user requested topology perspective according a included within the SAN management database and data associated with a previously requested topology perspective.

DETAILED DESCRIPTION

The invention will be described primarily as a system and method for generating perspectives (e.g., host centric perspective, device centric perspective, etc.) of a SAN topology. In the following description, for purposes of explanation, numerous specific details are set forth in order to provide a thorough understanding of the present invention. It will be evident, however, to one skilled in the art that the present invention may be practiced without these specific details.

Those skilled in the art will recognize that an apparatus, such as a data processing system, including a CPU, memory, I/O, program storage, a connecting bus and other appropriate components could be programmed or otherwise designed to facilitate the practice of the invention. Such a system would include appropriate program means for executing the operations of the invention.

An article of manufacture, such as a pre-recorded disk or other similar computer program product for use with a data processing system, could include a storage medium and program means recorded thereon for directing the data processing system to facilitate the practice of the method of the invention. Such apparatus and articles of manufacture also fall within the spirit and scope of the invention.

Figure 1:
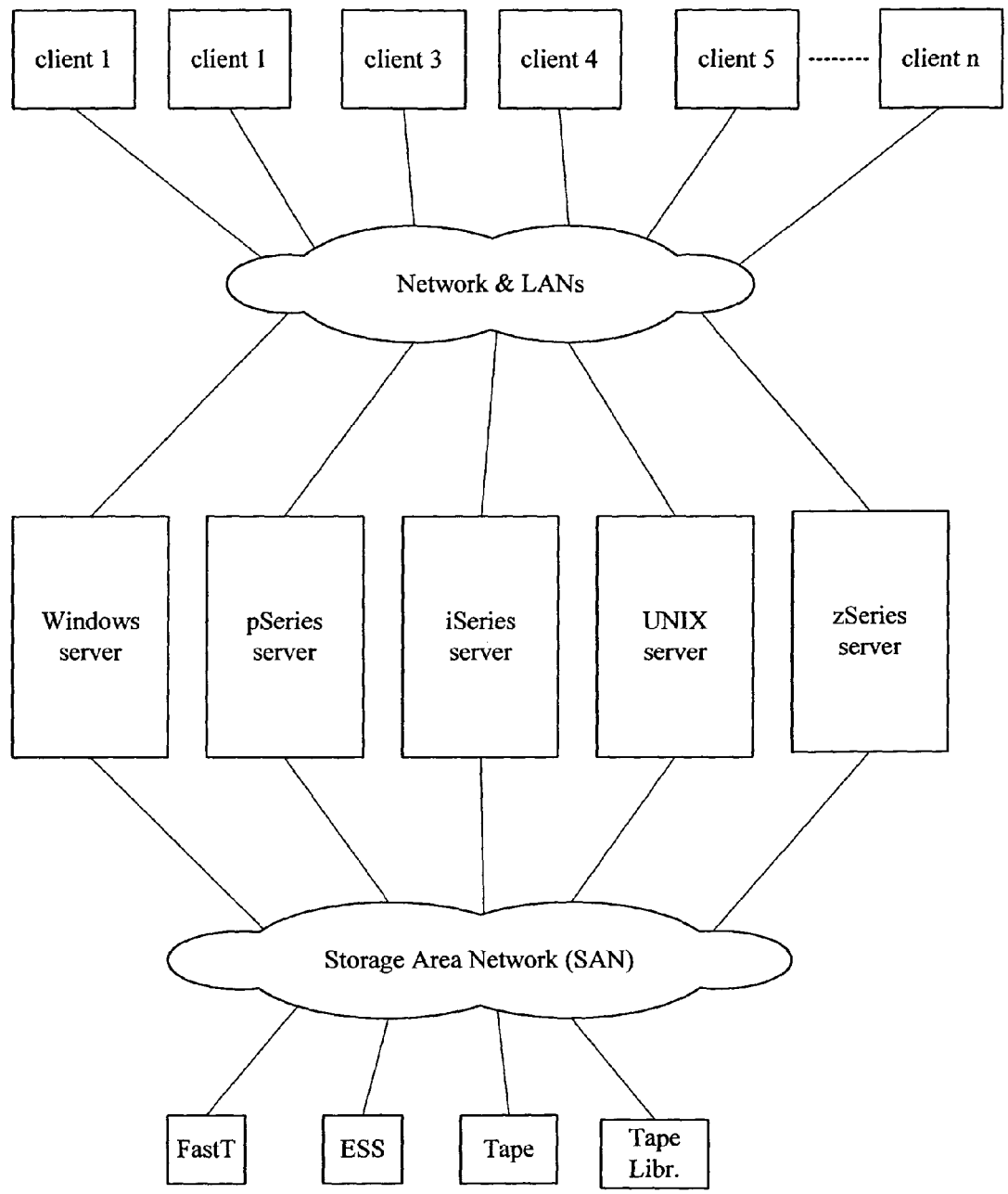
FIG. 1 shows a tiered overview of a SAN connecting multiple servers to multiple storage systems.

FIG. 1 shows a tiered overview of a SAN 10 connecting multiple servers to multiple storage systems. There has long been a recognized split between presentation, processing, and data storage. Client/server architecture is based on this three tiered model. In this approach, computer network can be divided into tiers: The top tier uses the desktop for data presentation. The desktop is usually based on Personal Computers (PC). The middle tier, application servers, does the processing. Application servers are accessed by the desktop and use data stored on the bottom tier. The bottom tier consists of storage devices containing the data.

In SAN 10, the storage devices in the bottom tier are centralized and interconnected, which represents, in effect, a move back to the central storage model of the host or mainframe. A SAN is a high-speed network that allows the establishment of direct connections between storage devices and processors (servers) within the distance supported by Fibre Channel. The SAN can be viewed as an extension to the storage bus concept, which enables storage devices and servers to be interconnected using similar elements as in local area networks (LANs) and wide area networks (WANs): routers, hubs switches, directors, and gateways. A SAN can be shared between servers and/or dedicated to one server. It can be local, or can be extended over geographical distances.

SANs such as SAN 10 create new methods of attaching storage to servers. These new methods can enable great improvements in both availability and performance. SAN 10 is used to connect shared storage arrays and tape libraries to multiple servers, and are used by clustered servers for failover. They can interconnect mainframe disk or tape to mainframe servers where the SAN devices allow the intermixing of open systems (such as Windows, AIX) and mainframe traffic.

SAN 10 can be used to bypass traditional network bottlenecks. It facilitates direct, high speed data transfers between servers and storage devices, potentially in any of the following three ways: Server to storage: This is the traditional model of interaction with storage devices. The advantage is that the same storage device may be accessed serially or concurrently by multiple servers. Server to server: A SAN may be used for high-speed, high-volume communications between servers. Storage to storage: This outboard data movement capability enables data to be moved without server intervention, thereby freeing up server processor cycles for other activities like application processing. Examples include a disk device backing up its data, to a tape device without server intervention, or remote device mirroring across the SAN. In addition, utilizing distributed file systems, such as IBM's Storage Tank technology, clients can directly communicate with storage devices.

SANs allow applications that move data to perform better, for example, by having the data sent directly from a source device to a target device with minimal server intervention. SANs also enable new network architectures where multiple hosts access multiple storage devices connected to the same network. SAN 10 can potentially offer the following benefits: Improvements to application availability: Storage is independent of applications and accessible through multiple data paths for better reliability, availability, and serviceability. Higher application performance: Storage processing is off-loaded from servers and moved onto a separate network. Centralized and consolidated storage: Simpler management, scalability, flexibility, and availability. Data transfer and vaulting to remote sites: Remote copy of data enabled for disaster protection and against malicious attacks. Simplified centralized management: Single image of storage media simplifies management.

Fibre Channel is the architecture upon which most SAN implementations are built, with FICON as the standard protocol for z/OS systems, and FCP as the standard protocol for open systems.

The server infrastructure is the underlying reason for all SAN solutions. This infrastructure includes a mix of server platforms such as Windows, UNIX (and its various flavors) and z/OS. With initiatives such as Server Consolidation and e-business, the need for SANs will increase, making the importance of storage in the network greater.

The storage infrastructure is the foundation on which information relies, and therefore must support a company's business objectives and business model. In this environment simply deploying more and faster storage devices is not enough. A SAN infrastructure provides enhanced network availability, data accessibility, and system manageability. The SAN liberates the storage device so it is not on a particular server bus, and attaches it directly to the network. In other words, storage is externalized and can be functionally distributed across the organization. The SAN also enables the centralization of storage devices and the clustering of servers, which has the potential to make for easier and less expensive, centralized administration that lowers the total cost of ownership.

In order to achieve the various benefits and features of SANs, such as performance, availability, cost, scalability, and interoperability, the infrastructure (switches, directors, and so on) of the SANs, as well as the attached storage systems, must be effectively managed. To simplify SAN management, SAN vendors typically develop their own management software and tools. A useful feature included within SAN management software and tools (e.g., Tivoli by IBM, Corp.) is the ability to provide a SAN topology. A SAN topology provides a pattern of interconnections (e.g., physical and logical) between devices (e.g., hosts, storage devices, switches, etc.). In addition to providing a SAN topology, it is useful to provide various perspectives of the SAN topology. Such perspectives identify subsets of the SAN topology. In the exemplary embodiment, perspectives of the SAN topology provide a graphical display of devices which are accessible or visible to a particular device in the SAN. For example, such perspectives are utilized to identify all storage devices connected to a particular host, all hosts connected to a particular storage device, all switches connected to a host, etc.

Figure 2:
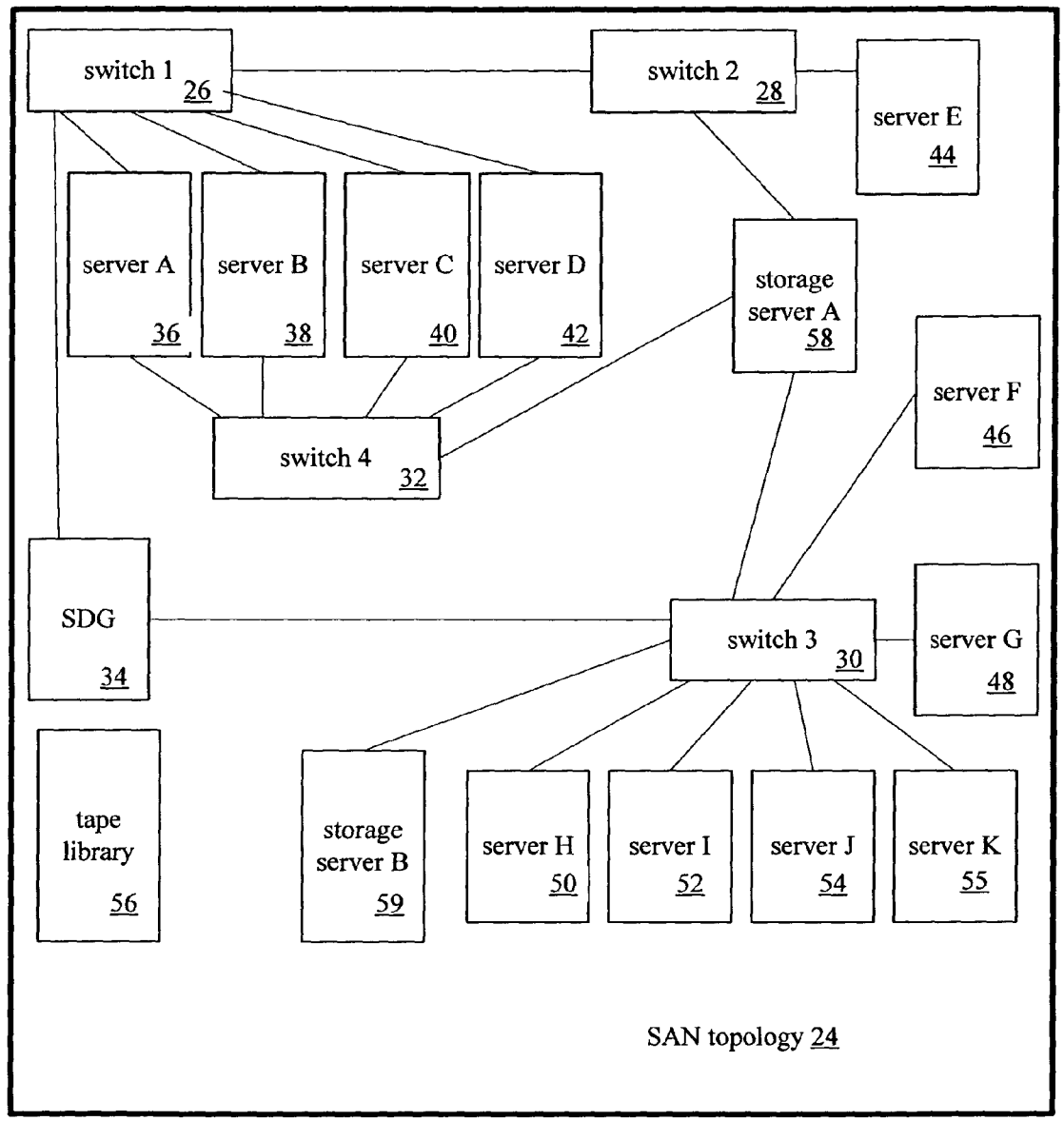
FIG. 2 is an exemplary SAN topology, according to one aspect of the invention.

FIG. 2 is an exemplary SAN topology 24, according to one aspect of the invention. SAN topology 24 includes ITSOSW1 switch 26, ITSOSW2 switch 28, ITSOSW3 switch 30 and ITSOSW4 switch 32. SAN topology 24 also includes SAN Data Gateway 34. SAN topology 24 further includes server A 36, server B 38, server C 40, server D 42, server E 44, server F 46, server G 48, server H 50, server 152, server J 54, and server K 55. Moreover, SAN topology 24 includes tape library 56, storage server A 58 and storage server B 59.

Figure 3:
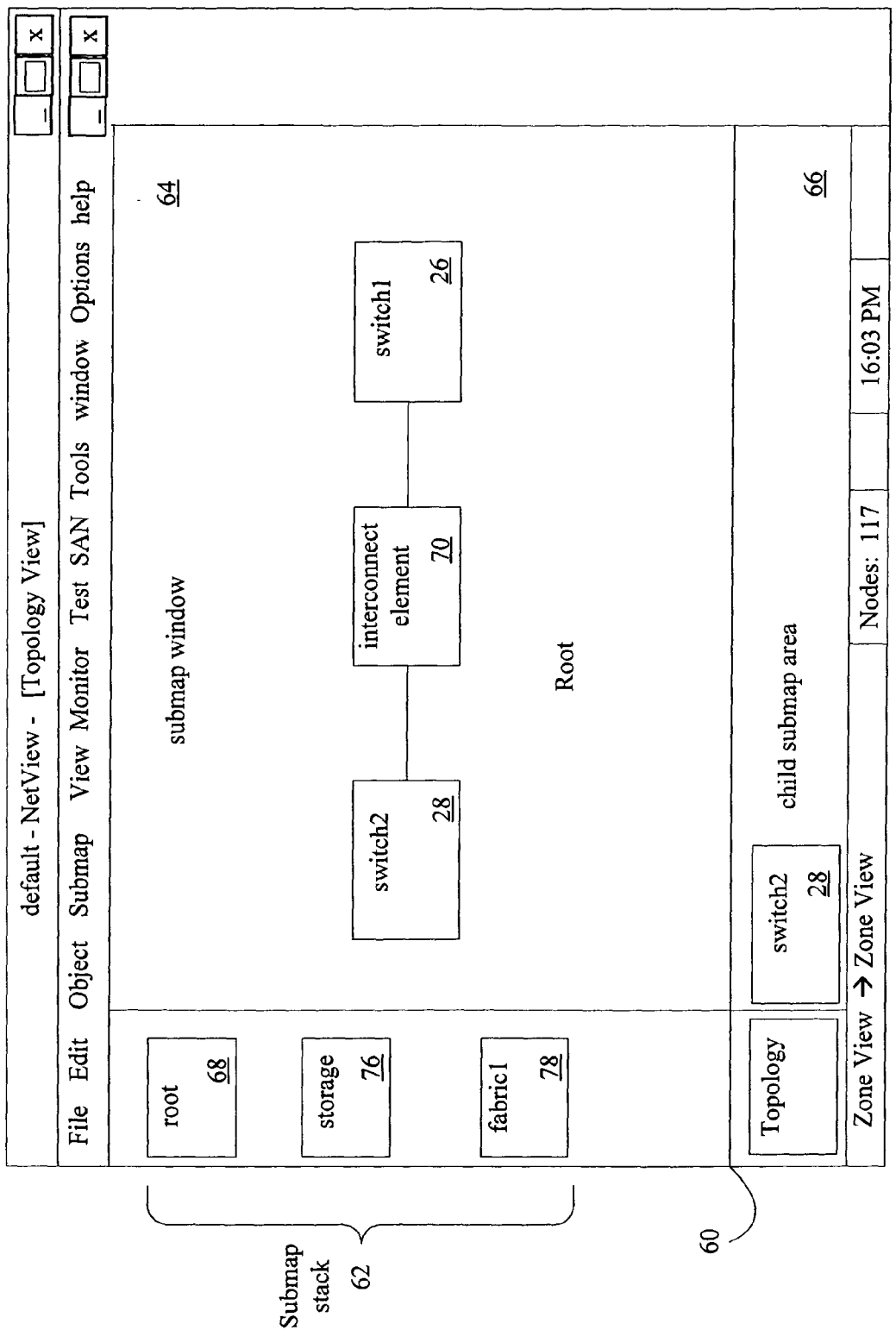
FIG. 3 is an exemplary user interface for viewing a SAN topology.

FIG. 3 is an exemplary user interface 60 for viewing a SAN topology (e.g., SAN topology 24). User interface 60 includes submap stack 62, submap window 64 and child submap area 66. Within submap stack 62 root map 68 is included. In the exemplary embodiment, maps and submaps can be used to navigate through a network topology and to retrieve details, such as topology perspectives. With regards to SAN topology, root map 68 is the main map and each dependent map is a submap. Submap window 64 includes an exemplary SAN topology.

Submap window 64 includes interconnect element 70. Interconnect element 70 facilitates connectivity between switch1 26 and switch2 28. Either of interconnect element 70, switch1 26 or switch2 28 may be another submap or device.

Submap stack 62 displays a stack of icons representing parent submaps including root map 68, storage map 76 and fabric1 78, all of which have been previously displayed. In the exemplary embodiment, the submap stack indicates the hierarchy of submaps opened for a particular map.

Child submap area 66 shows the submaps that have previously been opened from the submap currently open in the submap window 64. In the exemplary embodiment, a submap can be opened from the child submap area 66 or it can be brought into view if it is already opened in another window on the screen. The view provided in submap window 64 is the topology view 80 for the discovered SAN fabric1 78. In the exemplary embodiment, there may be multiple SAN fabrics (e.g., SAN fabric1 78, SAN fabric 2 . . . SAN fabric n).

Figure 4:
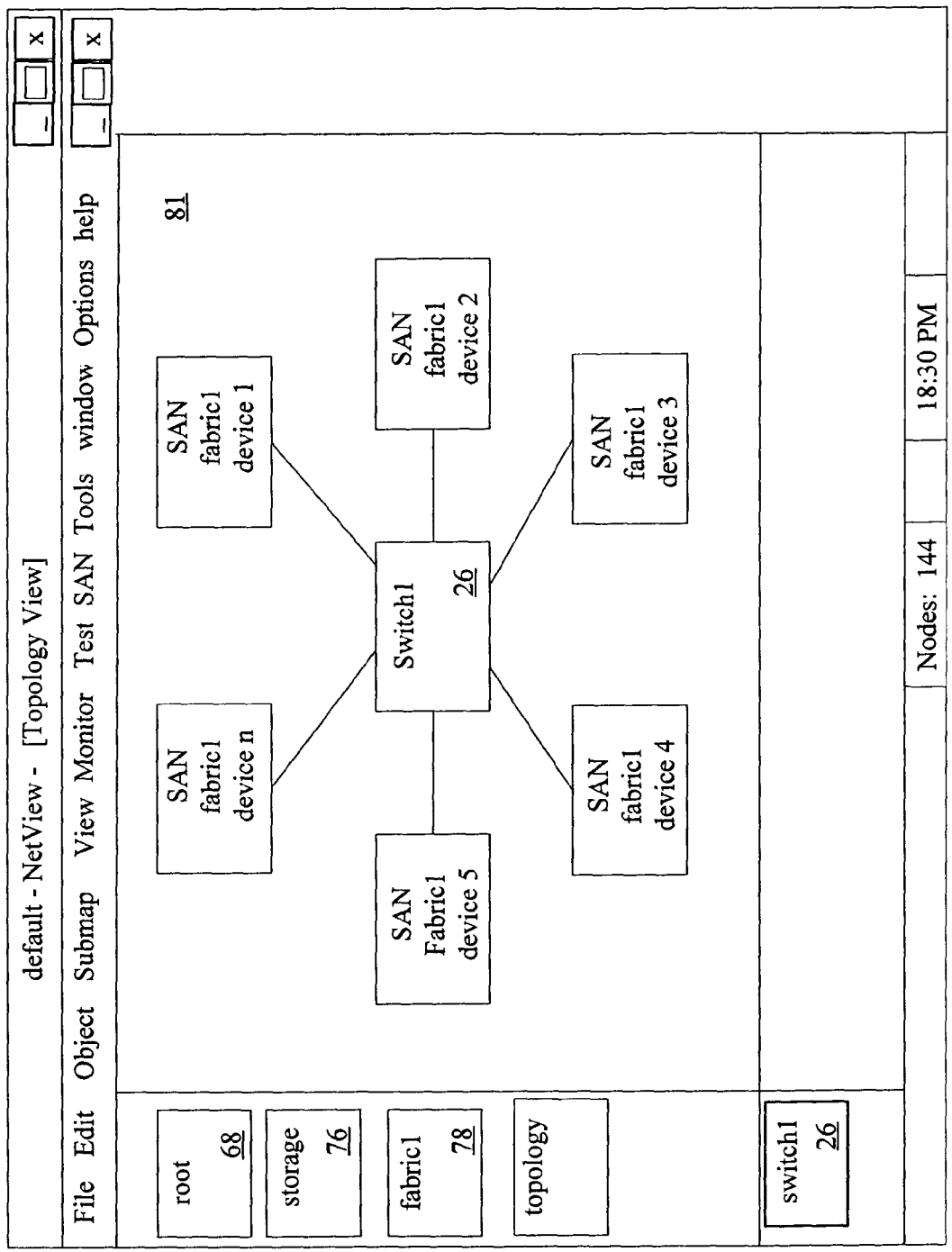
FIG. 4 is an exemplary user interface for showing a switch submap.

FIG. 4 is an exemplary user interface for showing switch submap 81. Switch submap 81 includes all devices in a SAN fabric1 78 which are connected to a switch1 26, according to an exemplary embodiment of the invention. Through selection of switch switch1 26 a user is provided with a display of all hosts and devices connected to the switch1 26. The lines between switch1 26 and each of the devices (e.g., switches, hosts, devices and interconnects) to which switch1 26 is connected, represent logical connections. Selection of a logical connection provides the number of physical connections between the two points.

Figure 5:
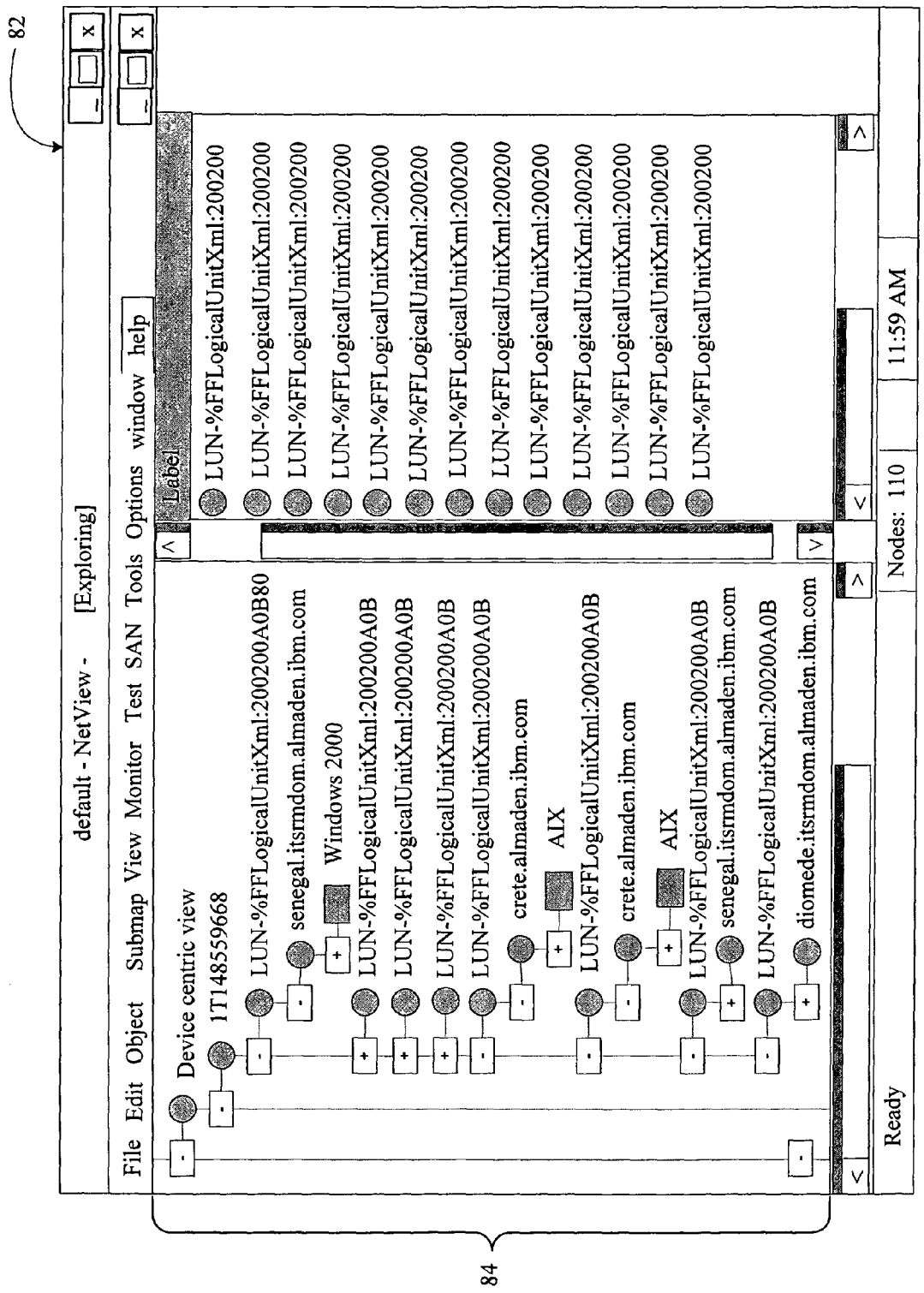
FIG. 5 is a user interface in which is shown a device centric perspective of storage devices that are connected to a SAN and their relationship to the hosts within the SAN.

FIG. 5 is a user interface in which is shown an exemplary device centric perspective 82 of storage devices that are connected to a SAN and their relationship to the hosts within the SAN according to an embodiment of the invention. The device centric perspective 82 provides a topology of all storage devices that are connected to a particular host. The device centric view can be selected through selection of storage map 76 (see FIG. 3). A SAN fabric may have multiple storage servers. The device centric perspective 82 allows users to see the storage devices within a SAN and their relationships to the hosts included within the SAN. For example, in device centric perspective 82 twelve LUNs are defined for host 1T14859668. Dependency tree 84 is consolidated from information retrieved from managed hosts within SAN topology 24.

Figure 6:
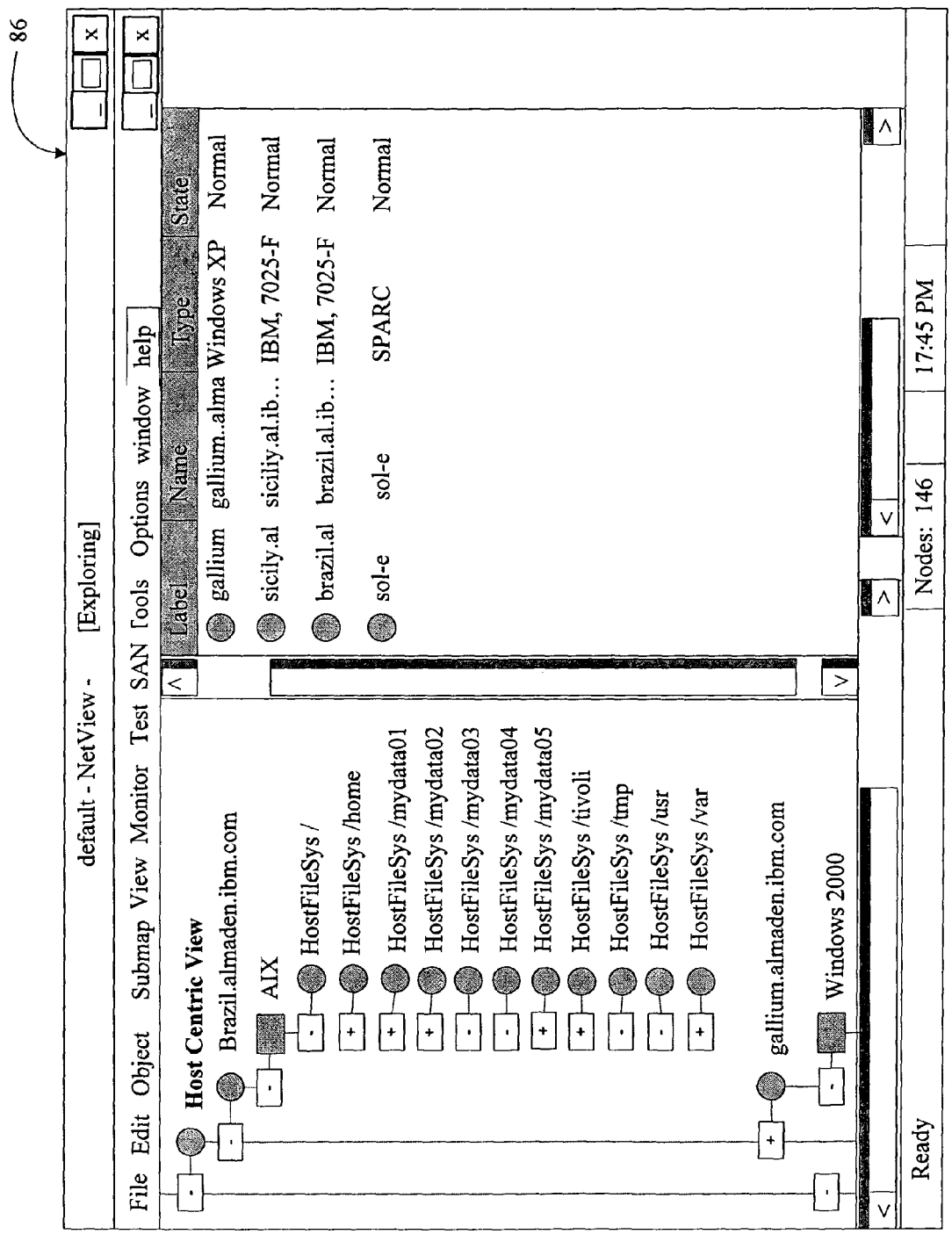
FIG. 6 is a user interface in which is shown a host centric perspective of hosts that are connected to a SAN and their related local and SAN-attached storage devices.

FIG. 6 is a user interface in which is shown a host centric perspective 86 of hosts included within SAN topology 24 and their related local and SAN-attached storage devices. The host centric perspective 86 provides a topology of all the hosts that are accessing a particular storage device.

A user interface (not shown) may also be utilized to select a SAN node perspective. A SAN node perspective identifies all nodes (e.g., hosts, storage devices, switches, interconnection devices, etc.) within a SAN which are accessible by a particular node within the SAN.

Figure 7:
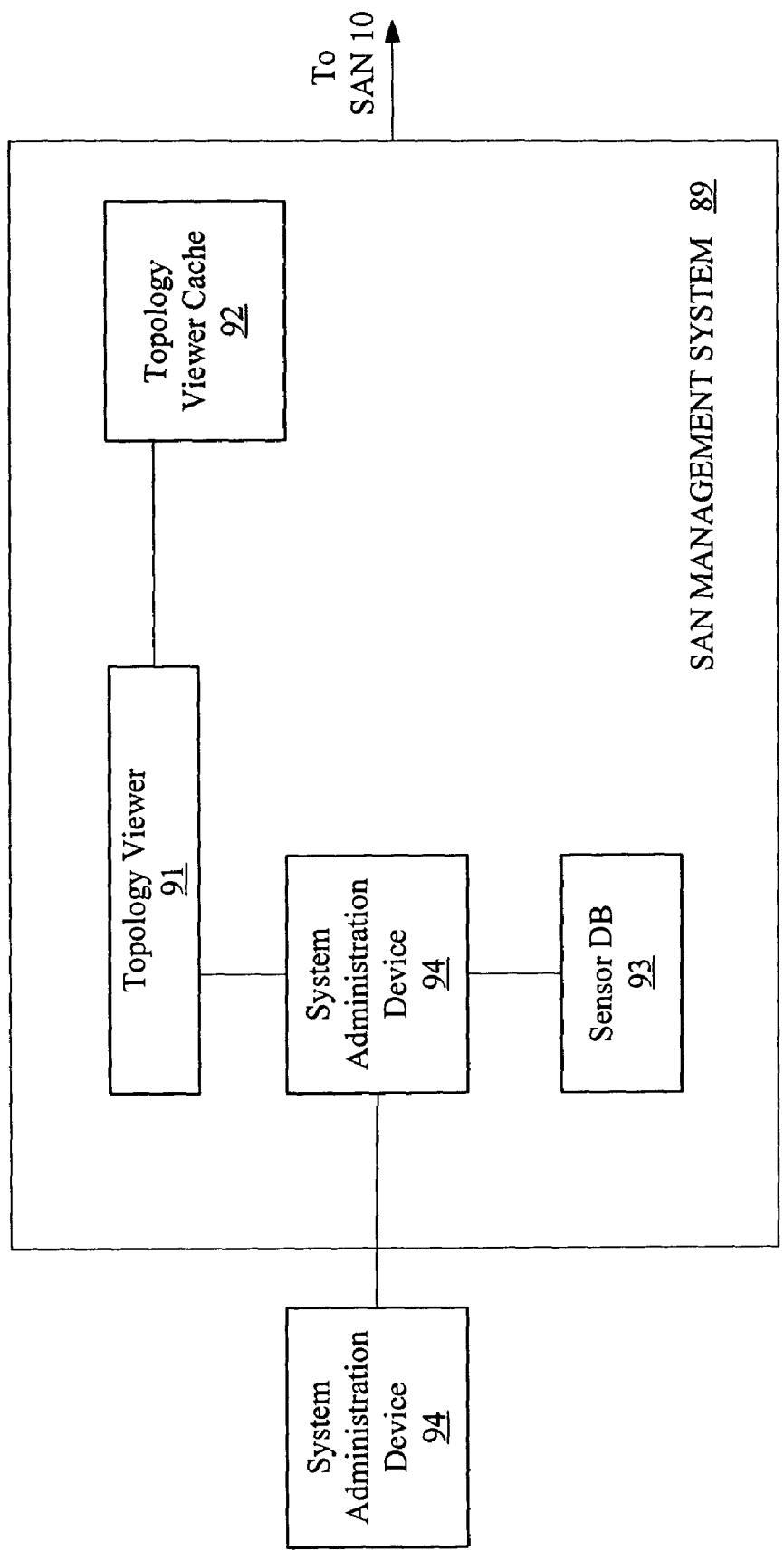
FIG. 7 is a block diagram of a SAN management tool including a topology viewer and a sensor database.

FIG. 7 is a block diagram of a SAN management system 89 including a SAN management program 90, topology viewer 91, topology viewer cache 92 and a sensor database 93. SAN management tool is attached to administrator display 94. The topology viewer 91 provides various perspectives (e.g., device centric perspective 82, host centric perspective 86, SAN node perspective, etc.) of SAN topology 24 which may be viewed (e.g., by a system administrator) at administrator display 94. One feature of the SAN management program 90 is the providing of different perspectives of SAN topology 24 (e.g., at administrator display 94). SAN management program 90 provides multiple topology perspectives (e.g., device centric perspective 82, host centric perspective 86, SAN node perspective, etc.).

SAN management program 90 communicates with sensor agents (not shown) positioned within devices (e.g., storage devices, hosts, switches, interconnection devices, etc.) included within SAN topology 24. The sensor agents gather status information (e.g., connections, state, etc.) regarding the devices within which they reside and provide that status information to sensor database 93. Topology viewer 91 utilizes the status information in sensor database 93 to generate various graphical perspectives (e.g., device centric perspective 82, host centric perspective 86, SAN node perspective, etc.) of the SAN. The sensor agents monitor the SAN for changes in the SAN's configuration. Changes identified by a sensor agent are reported to SAN Management program 90. Upon receiving information identifying changes in the SAN's configuration, the SAN management program 90 invalidates the current perspective within the SAN manager cache 92 and generates a new perspective including the identified changes to the SAN's configuration. An example of a change in a SAN's configuration includes failure of a device included within the SAN. The SAN management program 90 can verify the device failure by performing an in-band operation or an out-band operation.

Figure 8:
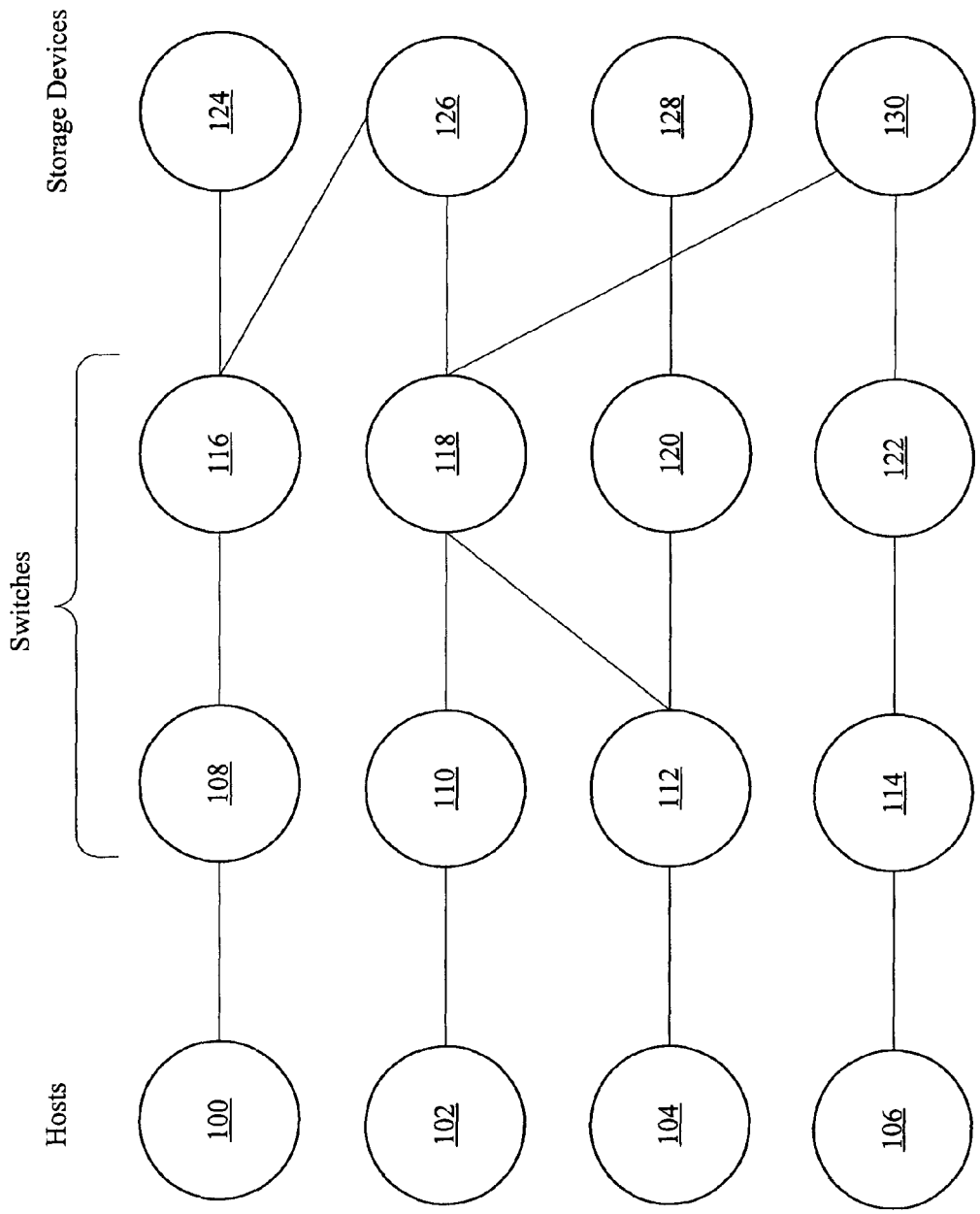
FIG. 8 is a SAN topology diagram showing an example of connections between hosts, switches and storage devices of a SAN, according to an exemplary embodiment of the invention.

FIG. 8 is a SAN topology diagram showing an example of connections between hosts, switches and storage devices of a SAN, according to an exemplary embodiment of the invention. The hosts in FIG. 8 are numbered 100, 102, 104 and 106. The switches are numbered 108, 110, 112, 114, 116, 118, 120 and 122. The storage devices are numbered 124, 126, 128 and 130. The lines in between the hosts, switches and storage devices indicate logical connections.

According to an exemplary embodiment of the invention, in response to a request to generate a topology perspective (e.g., device centric 82, host centric 86, etc.) SAN management program 90 utilizes (i.e., recycles) information gathered in the generating of prior SAN topology perspectives. Through utilization of prior perspective information (e.g., the paths between storage devices, switches and hosts) the traversing of paths included within a topology perspective associated with a current request can be reduced or minimized.

Figure 9:
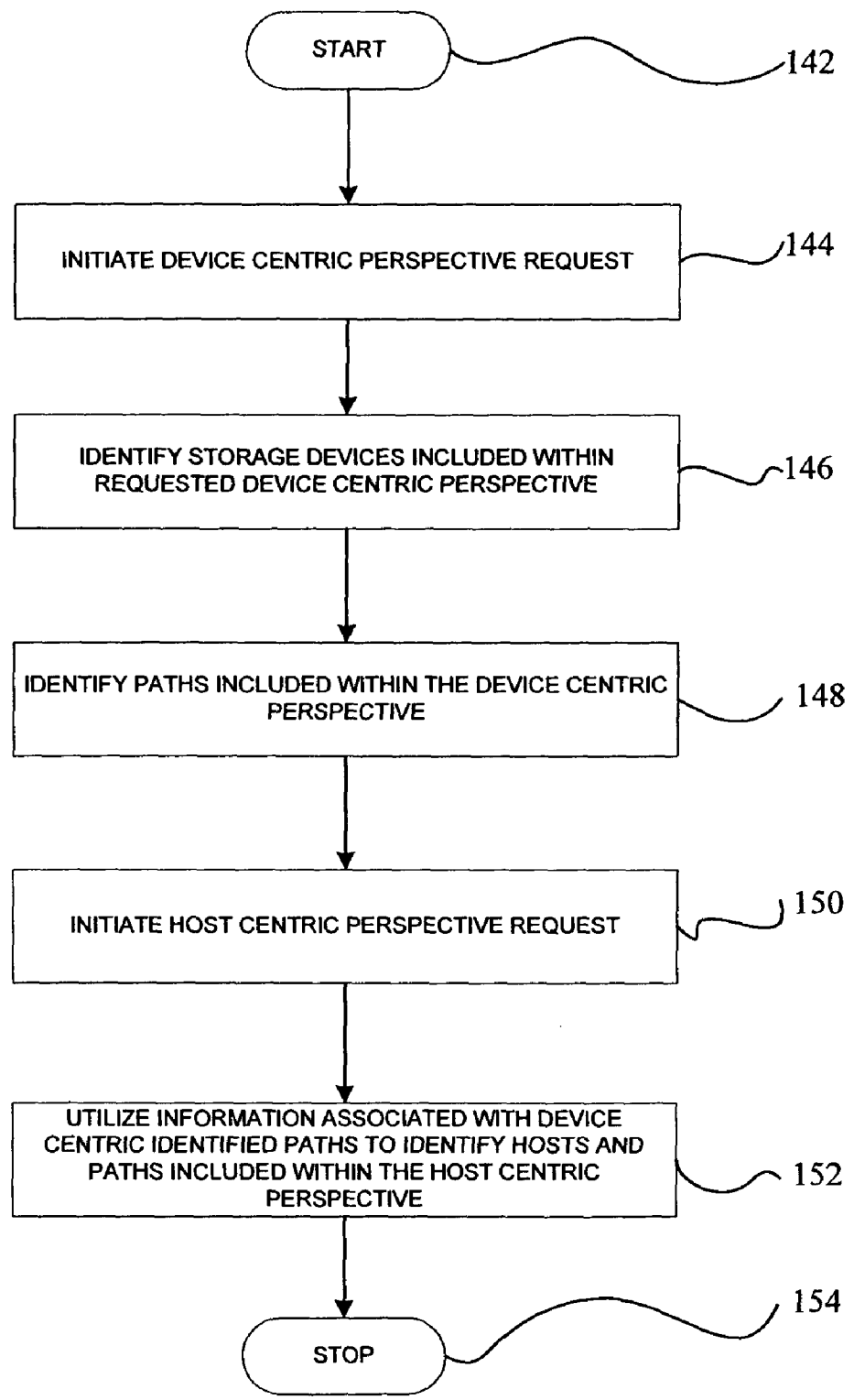
FIG. 9 illustrates a method of traversing a SAN topology diagram in order to generate a topology perspective in which the traversing of paths included within a requested topology perspective are reduced or minimized.

FIG. 9 illustrates a method 140 of traversing the SAN topology diagram of FIG. 8 in order to generate a topology perspective in which the traversing of paths included within a requested topology perspective can be reduced or minimized.

At block 142, method 140 begins. At block 144 a user initiates a device centric perspective 82 request associated with host 104. The device centric perspective request is entered at system administration device 94 and received by SAN management program 90. SAN management program 90 provides the request to topology viewer 91.

At block 146, topology viewer 91 identifies storage devices (e.g., 124, 126, 128 and 130) included within device centric perspective 82 through interactions with SAN management program 90 and sensor database 93. Accordingly, storage devices 126, 128 and 130 are included in the requested device centric perspective 82.

At block 148, topology viewer 91 identifies paths include within device centric perspective 82. Accordingly, paths 104-112-118-126, 104-112-120-128, 104-112-118-130 and 102-110-118 are included in the requested device centric perspective 82. The requested device centric perspective may be presented to a user (e.g., system administrator) at a graphical user interface (e.g., system administration device 94).

At block 150, the user requests a host centric perspective 86 associated with storage device 130.

At block 152, topology viewer 91 identifies hosts and paths included within the requested host centric perspective 86. Host devices 102, 104 and 106 are included in the requested host centric perspective 86. Paths 122-114-106, 118-110-102 and 118-112-104 are included in the requested host centric perspective 86. However, at block 152, when the host centric perspective 86 is generated, the topology viewer 91 does not traverse paths 118-110-102 or 118-112-104. Instead, paths 118-110-102 and 118-112-104 are retrieved from the previous device centric perspective 82 request made above (see blocks 144-148). At block 154, method 140 ends. The utilization of information pertaining to paths 118-110-102 and 118-112-104 obtained from the prior device centric perspective results in the topology viewer 91 not having to re-traverse paths 118-110-102 and 118-112-104. The host centric topology perspective 86 generated at block 152 is presented to the requestor at administration display 94.

The approach to generating a topology perspective introduced in FIG. 8 and FIG. 9 can result in a reduction in the number of data request from the topology viewer 91 to the SAN management program 90 in the generating of a topology perspective.

Figure 10:
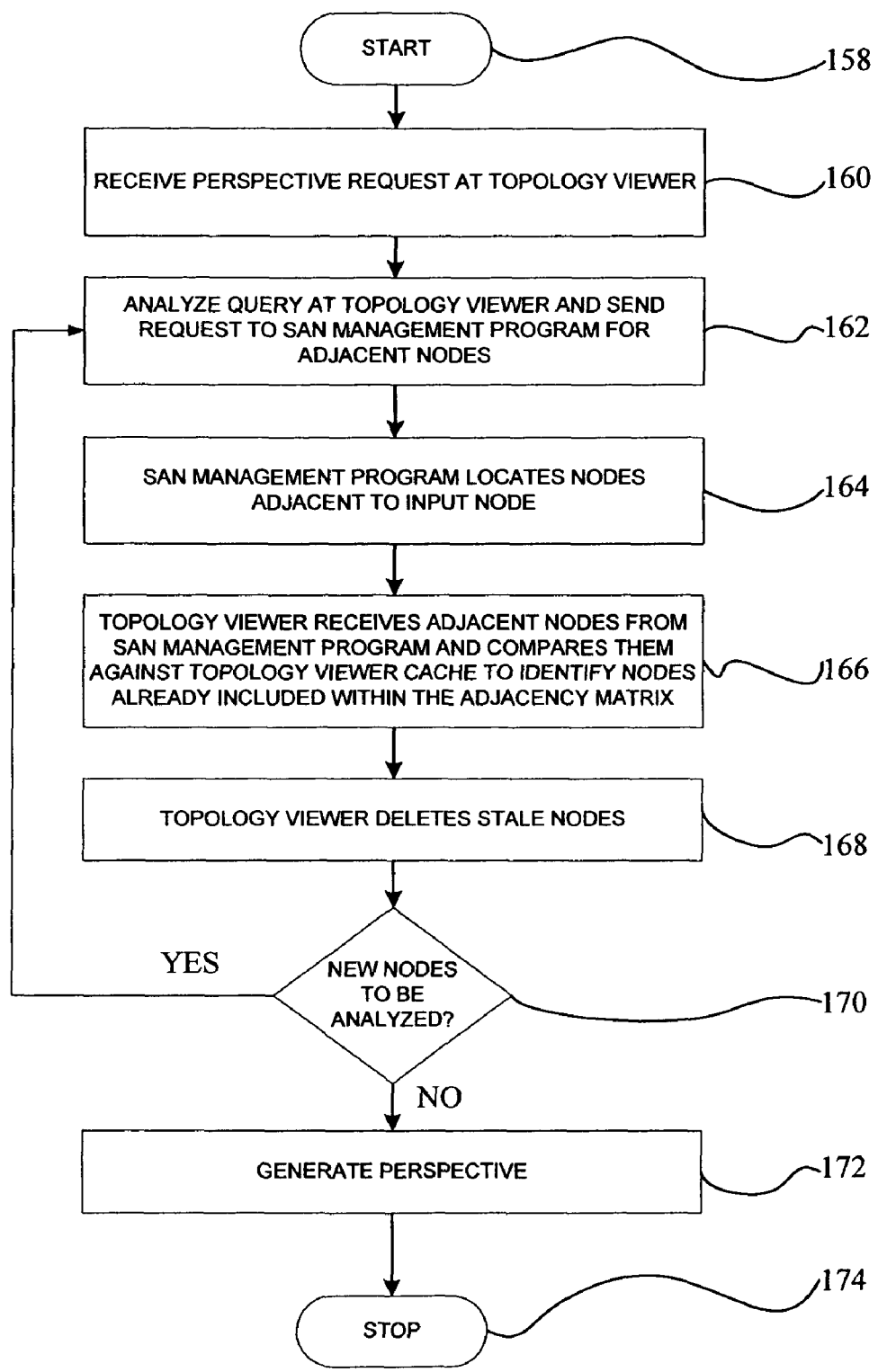
FIG. 10 illustrates a more detailed method of traversing a SAN topology diagram in order to generate a topology perspective in which the traversing of paths included within a requested topology perspective are minimized.

FIG. 10 illustrates a more detailed method 156 of traversing a SAN topology diagram in order to generate a topology perspective in which the traversing of paths included within a requested topology perspective can be reduced or minimized.

At block 158, method 156 begins. At block 160, topology viewer 91 receives a query requesting the generation of a topology perspective (e.g., device centric perspective, host centric perspective, etc.) corresponding to a specific input node (i.e., host). Upon receiving the query, the topology viewer initiates iterative breadth-first processing from the input node to determine the requested topology perspective. While the input node in block 160 is identified as a host, the input node can be a storage device, switch, interconnect device, or any other device included with the SAN's topology.

At block 162, the topology viewer 91 analyzes the query and sends a request to the SAN management program 90 to provide a set of adjacent nodes associated with the specific input node for which the topology perspective was requested.

At block 164, the SAN management program 90 searches the SAN management database and retrieves the list of adjacent nodes associated with the input node.

At block 166, upon receiving the list of adjacent nodes from SAN management program 90, the topology viewer 91 compares them against an adjacency matrix (see Table 1) stored in the topology viewer cache 92 to determine which nodes are already included within the adjacency matrix. The topology viewer 91 also identifies those nodes which should not be in the adjacency matrix. Nodes which should not be included in the adjacency matrix include new nodes which were not retrieved as part of prior perspective requests and nodes no longer stored (e.g., current) in sensor database 93.

TABLE 1

Topology Viewer Cache Adjacency Matrix

| 1 | 5 | 6 | 7 | 8 | | | |
|---|---|---|---|---|---|---|---|
| 2 | 6 | 7 | | | | | |
| 3 | 7 | | | | | | |
| 4 | 7 | 8 | | | | | |
| 5 | 1 | 9 | | | | | |
| 6 | 1 | 2 | 9 | 10 | | | |
| 7 | 1 | 2 | 3 | 4 | 9 | 10 | 11 |
| 8 | 1 | 4 | | | | | |
| 9 | 5 | 6 | 7 | 13 | | | |
| 10 | 6 | 7 | 14 | 16 | | | |
| 11 | 7 | 15 | | | | | |
| 12 | 8 | 16 | | | | | |
| 13 | 9 | | | | | | |
| 14 | 10 | | | | | | |

TABLE 1-continued

Topology Viewer Cache Adjacency Matrix

| 15 | 11 | |
|---|---|---|
| 16 | 10 | 12 |

The adjacency matrix provided in Table 1 above is described as an adjacency matrix where: (Let G=(V, E) be a graph, where V is indexed by $\{1, 2, \ldots, n\}$. The n×n adjacency matrix of G is defined by $A[v,w]=\{1$ if $\{v, w\}$ belongs to E, 0 otherwise) data structure (An Adjacency List is an array Adj $[1 \ldots n]$ of pointers, where Adj[u] points to a linked list containing the vertices u such that $\{u,v\}$ (undirected) or (u, v) (directed) is an edge. A directed graph G is represented by an adjacency matrix X such that An entry $X_{p,q}=1$ if and only if there is an edge from p to q, Otherwise $X_{p,q}=0$) that corresponds to the SAN topology 24.

At block 168, the topology viewer 91 deletes those nodes from the adjacency matrix that have become stale.

At block 170, a determination is made as to whether there are additional new nodes to be analyzed. If yes and the node is not a host node (e.g., host 100, 102, 104 and 106) or a storage device node (e.g., 124, 126, 128 and 130), then method 156 returns to block 162. Processing is not performed on those adjacent nodes which are already present in the adjacency matrix from previous perspectives or nodes which are identified as host node or storage device node. Thus, through leveraging existing data from previous perspective queries, only nodes identified as new at block 170 require additional processing. This can result in minimizing time required to generate a topology perspective. No additional processing is required on those nodes identified as host node or storage device node because these nodes are the end-points in a SAN 10.

Returning to block 170. If no, then at block 172, the topology viewer 91 generates the requested topology perspective and presents it to the user at administration display 94. At block 174, method 156 ends.

Thus, a method and system to provide topology perspectives of a SAN have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A storage area network (SAN) management system, including a CPU and memory, to generate perspectives of a SAN topology, the SAN management system including:
    a SAN manager program to monitor a storage area network (SAN), said SAN manager program capable of generating an adjacency matrix, said SAN manager program capable of facilitating direct data transfers between storage devices without server intervention, and said SAN manager program utilizing information gathered in the generating of prior SAN perspectives,
    a SAN management database linked with the SAN manager program, wherein the SAN management database maintains information identifying devices included within the SAN and connections between the devices;
    a plurality of sensor agents positioned within devices included within the SAN, wherein the sensor agents gather information associated with events occurring within the SAN and provide the gathered information to the SAN manager for inclusion within the SAN management database; and a topology viewer linked to the SAN manager to generate a user requested topology perspective according to data included within the SAN management database and data associated with a previously requested topology perspective, said topology viewer including memory for storing information pertaining to previously requested topology perspectives, said topology viewer enabled to generate a view of physical connections given a selection of a logical connection.

2. The system of claim 1 wherein the SAN includes hosts, storage devices and switches.

3. The system of claim 2 wherein the host comprises a database server or a file server.

4. The system of claim 1 wherein the topology perspective is generated for all devices within the SAN which are visible to a particular host.

5. The system of claim 1 wherein the topology perspective is generated for all devices within the SAN which are visible to a particular storage device.

6. The system of claim 1 wherein the information pertaining to previously requested topology perspectives includes paths which provide access between devices within the SAN.

7. A computer program product for use with a data processing system, the computer program product comprising a storage medium and program means recorded thereon for:
   receiving a request to provide a perspective of a SAN topology;
   analyzing the request at a topology viewer and sending the request to a SAN management program for adjacent nodes;
   receiving adjacent nodes from the SAN management program by the topology viewer and comparing them against a topology viewer cache to identify modes already included with an adjacency matrix;
   determining by the topology viewer those nodes which should not be in the adjacency matrix;
   calculating data paths within the requested perspective which have not been previously calculated;
   utilizing information gathered in the generating of prior SAN topology perspectives by the SAN management program from memory in the SAN management program allocated for that purpose,
   generating the requested perspective according to both the previously calculated data paths and the calculated data paths; and,
   enabling the generation of a view of physical connections given a logical data connection.

8. The computer program product of claim 7 wherein the perspective includes all SAN devices within the SAN topology which are connected to an identified SAN device and all SAN devices which are accessible to the identified SAN device, wherein the identified SAN device is included within the SAN topology.

9. The computer program product of claim 8 wherein the perspective includes a graphical map of all devices within the SAN topology which are visible to the identified device, and connections between all of the devices included within the graphical map.

10. The computer program product of claim 8 wherein the identified SAN device includes a host, a storage device and a switch.

11. The computer program product of claim 10 wherein the host comprises a database server or a file server and the storage devices comprise JBODs and storage controllers.

12. A SAN management system device including system readable code readable by a server system for generating a perspective of a SAN topology, comprising:
   logic means for receiving a request to provide a perspective of a SAN topology;
   logic means for analyzing the request at a topology viewer and sending the request to a SAN management program for adjacent nodes;
   logic means for receiving adjacent nodes from the SAN management program by the topology viewer and comparing them against a topology viewer cache to identify modes already included with an adjacency matrix;
   logic means for determining by the topology viewer those nodes which should not be in the adjacency matrix;
   logic means for calculating data paths within the requested perspective which have not been previously calculated;
   logic means for utilizing information gathered in the generating of prior SAN topology perspectives by the SAN management program from memory in the SAN management program allocated for that purpose;
   logic means for generating the requested perspective according to both the previously calculated data paths stored in memory allocated for that purpose and the calculated data paths,
      whereby the perspective includes all SAN devices within the SAN topology which are connected to an identified SAN device and all SAN devices which are accessible to the identified SAN device, wherein the identified SAN device is included within the SAN topology; and,
   logic means for generating a view of physical connections given a selection of a logical connection.

* * * * *